Dec. 8, 1936.  B. G. HALL  2,063,499
FLOUR SIFTER
Filed Feb. 1, 1933   3 Sheets-Sheet 1
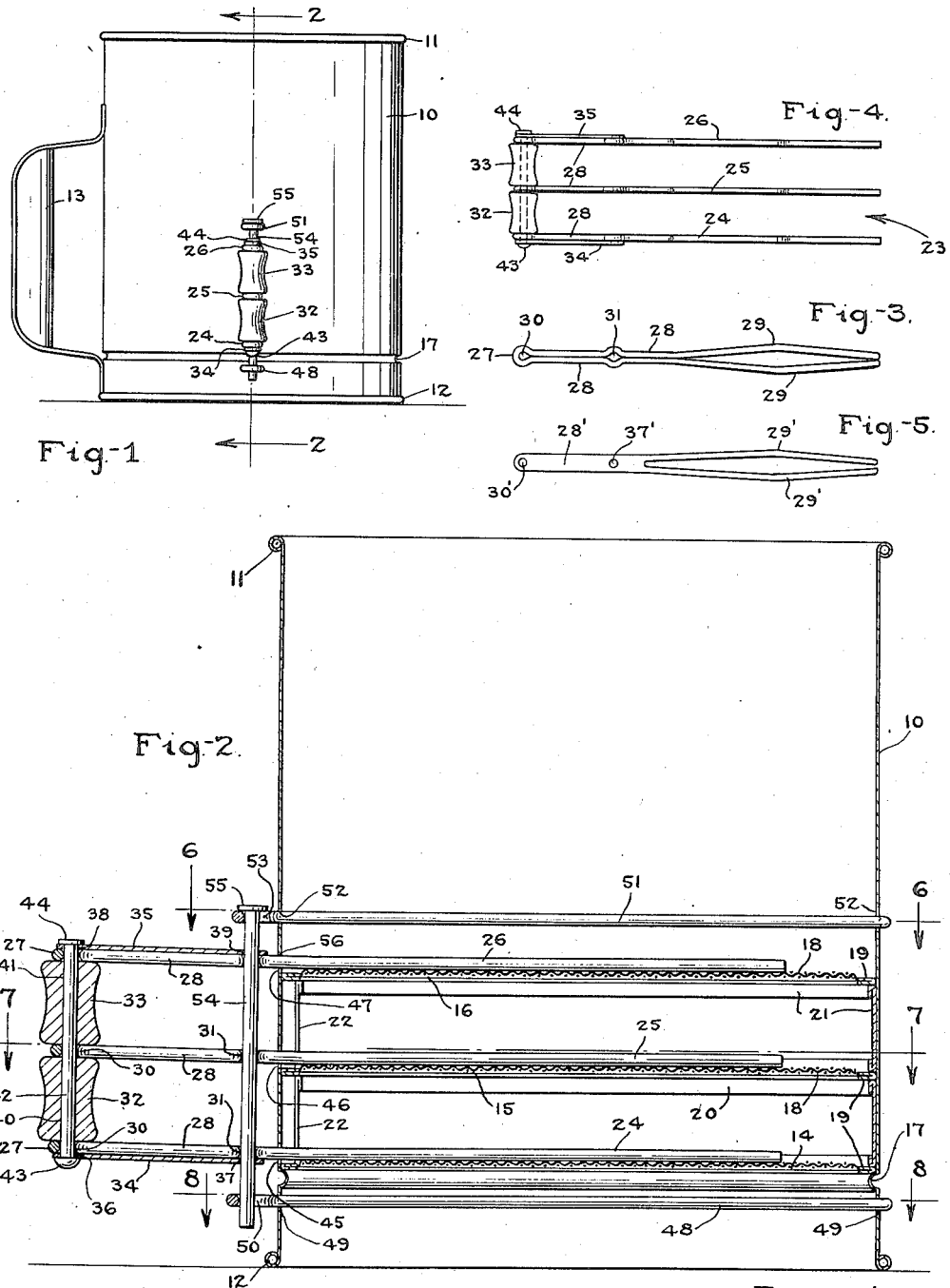
Inventor:
Basil G. Hall

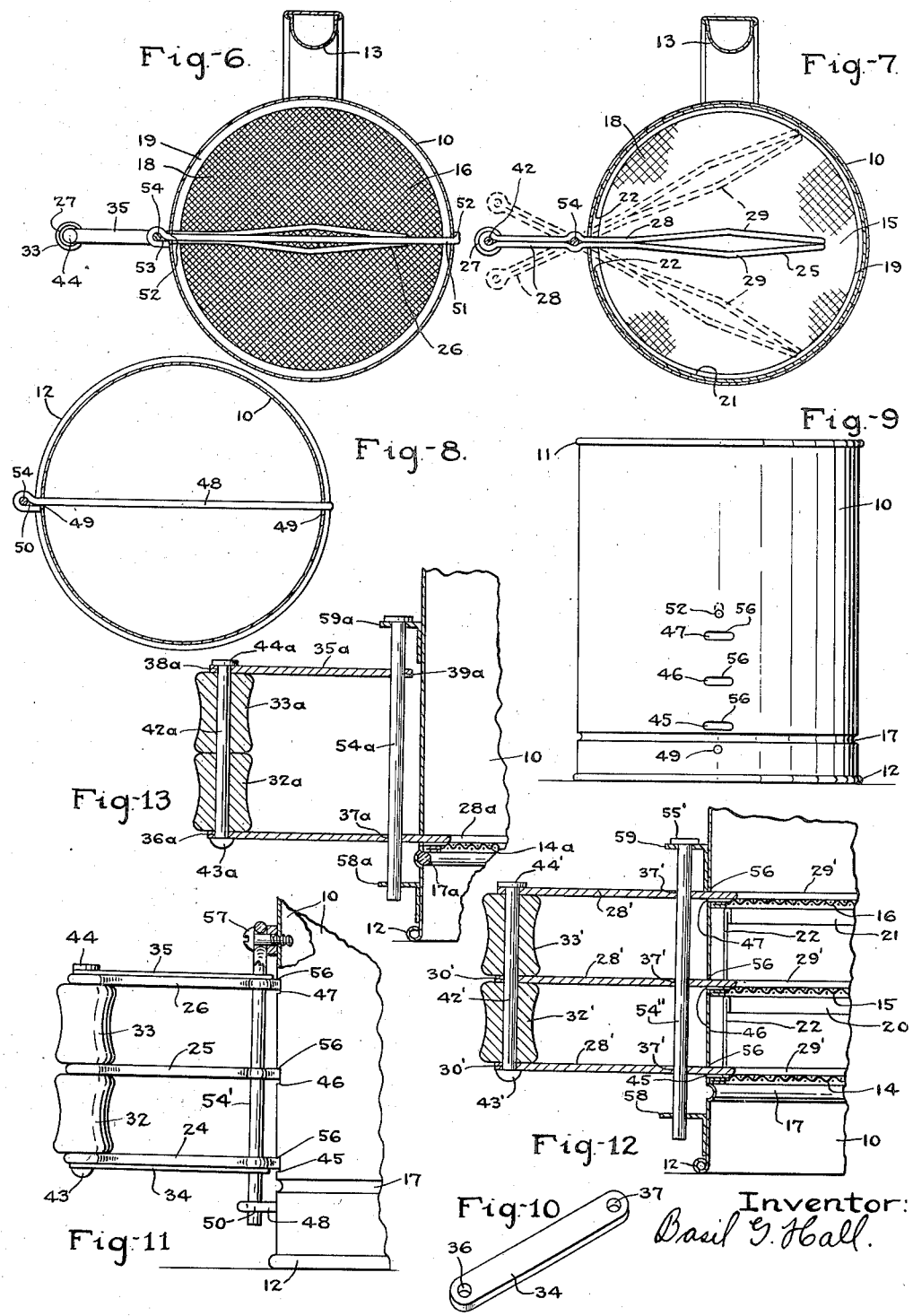

Dec. 8, 1936.                B. G. HALL                 2,063,499
                            FLOUR SIFTER
               Filed Feb. 1, 1933           3 Sheets-Sheet 3

Inventor:
Basil G. Hall.

Patented Dec. 8, 1936

2,063,499

UNITED STATES PATENT OFFICE 2,063,499

FLOUR SIFTER

Basil G. Hall, Minneapolis, Minn.

Application February 1, 1933, Serial No. 654,659

5 Claims. (Cl. 209—357)

A flour sifter of the type heretofore known consists of an open ended casing for receiving flour, a plurality of sieves disposed in spaced apart, superposed relation in said casing, a plurality of agitators, including an agitator for each sieve, and means for simultaneously operating all of said agitators to cause the flour to successively pass by gravity through the several sieves, to thus be sifted a plurality of times, the number of times the flour is sifted depending, naturally, upon the number of sieves employed. The sieves, agitators, and means for operating the agitators of said mentioned flour sifter now of commerce, however, are all permanently associated with the casing of said sifter, making it practically impossible to clean the flour sifter. And furthermore, flour sifters of the general character as set forth have been, prior to my invention, of expensive and cumbersome construction.

An object of the present invention is to provide a novel and improved flour sifter which will consist of an open ended flour receiving casing, a plurality of sieves disposed in spaced apart, superposed relation in said casing, a plurality of agitators, at least one for each sieve, and means for simultaneously causing relative movement between each sieve and its corresponding agitator, whereby to successively pass the flour by gravity through the several sieves, and thus sift said flour a plurality of times, and wherein all of said sieves and all of said agitators, and preferably said means, will be detachably associated with said casing, to be readily and easily removable therefrom and replaceable in operative relation therein.

A further object is to provide a flour sifter of the character as stated, wherein the removable sieves and agitators employed will be associated with the casing of the flour sifter and with each other in novel and improved manner.

A further object is to provide in the flour sifter, an agitator unit of novel and improved construction, and which will include agitators, one for each sieve, co-operating with the sieves in novel and improved manner to accomplish the flour sifting operation.

A further object is to provide a flour sifter including an open ended flour receiving casing, at least one sifting screen in said casing and removable from an end thereof, at least one agitator removably insertable through the wall of said casing, and means for accomplishing relative movement of an agitator and a corresponding sifting screen in such manner that flour will be sifted through said screen.

A further object is to provide a flour sifter including an open ended flour receiving casing, superposed sifting screens in said casing and removable from an end thereof, means spacing said sifting screens apart, agitators insertable through the wall of said casing, a device without the casing for operating said agitators, and an arrangement of means so mounting the agitators upon the casing and relatively to the sifting screens that each agitator will wipe with pressure against its corresponding screen during the flour sifting operation.

A further object is to provide a flour sifter of the character as stated, wherein each of the necessary parts of the sifter will be of simple and inexpensive construction, capable of being assembled together by expenditure of a minimum effort.

Further objects and advantages of the invention will become apparent from the following description.

In the accompanying drawings:

Fig. 1 is a side elevation of one embodiment of my invention.

Fig. 2 is an enlarged central vertical section taken substantially on the line 2—2 of Fig. 1.

Fig. 3 is a top plan view of one of the agitators.

Fig. 4 is a side view showing three of the agitators assembled into an agitating unit.

Fig. 5 is a top plan view of another form of agitator.

Fig. 6 is a transverse or horizontal sectional view taken on the line 6—6 of Fig. 2.

Fig. 7 is a horizontal sectional view taken on the line 7—7 of Fig. 2.

Fig. 8 is a horizontal sectional view taken on the line 8—8 of Fig. 2.

Fig. 9 is a side view of the casing member with the agitating unit removed, showing the apertures in the casing member for receiving the agitators.

Fig. 10 is an isometric view of one of the elements of the agitating unit of Fig. 4.

Fig. 11 is a fragmentary side view partly in section showing a modified form of mounting for the agitating unit.

Fig. 12 is a fragmentary sectional view showing an agitating unit including agitators as in Fig. 5, and a further modified form of mounting for said agitating unit.

Fig. 13 is a fragmentary sectional view of a flour sifter including a single sieve, and an agitating unit having a single agitator.

Figure 14:
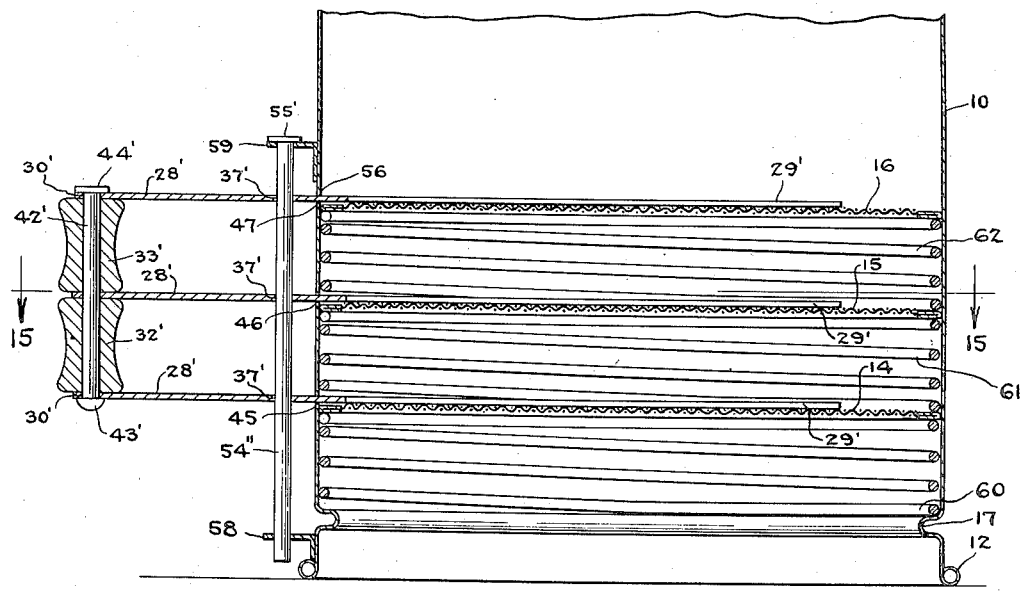
Fig. 14 is a fragmentary vertical section showing a modified manner of mounting the sieves and agitators of a flour sifter made according to the invention.

Referring to Figs. 1, 2, 3, 4, 6, 7, 8, 9, and 10 of the drawings, 10 denotes the casing of the flour sifter, which casing is of any suitable capacity and is open at its top and bottom. Conveniently, the top and bottom of the casing are rolled outwardly, as indicated at 11 and 12, respectively. Numeral 13 designates the usual handle for the flour sifter, rigidly attached to the casing 10.

The casing 10 removably carries a plurality of spaced apart screens or sieves, there being three screens or sieves as disclosed, represented 14, 15, and 16. The lower sieve 14 is conveniently supported in the lower portion of the casing. As shown, said lower portion of the casing is shaped to provide an inwardly extending annular bead 17 against which the sieve 14 rests, although said sieve could be supported in any other convenient manner, as for example, to be removable from the bottom of the casing.

The sieves 14, 15, and 16 may be of duplicate construction each consisting of a circular screen 18 of relatively fine mesh carried by an annular member 19 of any suitable material, such as metal or fiber. Said sieves 14, 15, and 16 are desirably of diameter to snugly fit the casing 10, but to be freely slidable along said casing.

The sieves 14, 15, and 16 are spaced apart by suitable spacing members 20 and 21, which also snugly fit the casing 10 to be slidable therealong. That is, a lower spacing member 20 has its lower edge resting upon the sieve 14, the sieve 15 rests upon the upper edge of said lower spacing member, an upper spacing member 21 has its lower edge resting upon the sieve 15, and the sieve 16 rests upon the upper edge of said upper spacing member.

The spacing members 20 and 21 may be duplicates. As shown, each consists of an open ended band of metal extending about the greater portion of the circumference of the casing 10, the ends 22 of said band of metal terminating in spaced relation to each other, as shown more clearly in Figs. 2 and 7, for a purpose to be explained. Each spacing member 20 and 21 preferably has a slight tendency to spread, so that when they are inserted in the casing 10 they will naturally cling to the wall of said casing, as will be understood.

It will be apparent that the sieves 14, 15, and 16, and the spacing members 20 and 21, can be quickly and easily inserted into or removed from the casing 10, and that when said mentioned elements are inserted in said casing, they are stably associated with the casing and are not liable to become displaced from their intended positions therein or dislodged therefrom. While a specific type of spacing member for the sieves has been illustrated and described, it will be obvious that same other type of spacing means (not shown) could be substituted. It should be remarked, however, that any means employed to space the sieves apart would desirably but not necessarily be removable from the casing 10.

Also, while I have illustrated and described three sieves 14, 15, and 16 removably mounted in the casing 10, attention is called to the fact that a greater or less number of sieves can be utilized. In any event, for each sieve employed, there is at least one corresponding agitator, said agitators being adapted to the purpose of wiping over said sieves.

The flour sifter includes what I prefer to call an agitating unit, denoted generally at 23. As disclosed more clearly in Figs. 2, 4, 6, and 7, said agitating unit includes agitators 24, 25, and 26, of any suitable material, desirably metal, corresponding to the sieves 14, 15, and 16, respectively. In the form of the invention shown in Figs. 1 to 4 and 6 to 10, the agitators are constructed after the fashion as in Fig. 3, each consisting of a piece of wire bent intermediate its ends, as at 27, to provide parallel superposed portions 28 of the wire, which portions 28 merge into the spread apart extensions 29 at the free end portion of the agitator. The portions 28 are shaped to provide a rivet receiving opening 30 adjacent the bend 27, and a passage 31 adjacent said opening 30, in slightly spaced relation thereto.

The agitating unit 23 additionally includes spacing elements, indicated 32 and 33, and bearing elements, represented 34 and 35. As shown more clearly in Figs. 2 and 4, the bearing element 34 engages against the lower surface of the agitator 24 and includes an opening 36 at its outer end in alinement with the adjacent rivet receiving opening 30, and a bearing aperture 37 at its inner end in alinement with the adjacent passage 31. The bearing element 35 engages against the upper surface of the agitator 26 and includes an opening 38 at its outer end in alinement with the adjacent rivet receiving opening 30 and a bearing aperture 39 at its inner end in alinement with the adjacent passage 31. The spacing element 32 is disposed between the agitators 24 and 25, and includes a longitudinal slot 40 in alinement with the openings 30 in said agitators 24 and 25, respectively. The spacing element 33 is disposed between the agitators 25 and 26, and includes a longitudinal slot 41 in alinement with the openings 30 in said agitators 25 and 26, respectively. A headed rivet 42 extending through all of the openings 30, 36, and 38, and through the longitudinal slots 40 and 41 securely clamps the agitators 24, 25, and 26 in spaced, parallel relation, the agitator 24 being clamped between the head 43 of the rivet and the adjacent end of the spacing element 32, the agitator 25 being clamped between the spacing elements 32 and 33, and the agitator 26 being clamped between the opposite head 44 of the rivet and the adjacent end of the spacing element 33.

When the agitators 24, 25, and 26 are clamped to each other in the manner as set forth, said agitators all lie in a single plane passing longitudinally through the rivet 42, so that all of the passages 31 and the bearing apertures 37 and 39 aline. The spacing elements 32 and 33 may be duplicates, and each is of length to space the agitators 24, 25, and 26 apart at distance equal to the distance between the sieves 14 and 15, and 15 and 16, respectively.

The casing 10 includes spaced apart, elongated horizontally disposed slots 45, 46 and 47 arranged in vertical alinement and adapted to removably receive the agitators 24, 25, and 26, respectively. Said slots 45, 46, and 47 are at distance apart equal to the distance between adjacent sieves and adjacent agitators, the slot 45 being disposed just above the sieve 14, the slot 46 being disposed an equal distance above the sieve 15, and the slot 47 being disposed the same distance above the sieve 16. Desirably, each elongated slot 45, 46 and 47 is of curvilinear conformation at its opposite ends.

To assemble the agitating unit with the casing 10 of the flour sifter, the agitators 24, 25, and 26 are inserted through the elongated slots 45, 46, and 47, respectively, to the positions as shown in Figs. 2, 6, and 7, and means is provided for operatively mounting the agitating unit upon the casing in such manner that said agitating unit can be manipulated to cause each agitator to wipe, desirably with pressure, over its corresponding sieve. It will be evident that the agitators wipe over the upper surfaces of the screens 18 of the sieves.

The means for mounting the agitating unit is best shown in Figs. 2, 6, 7, and 8. As there shown, numeral 48 indicates a lower horizontal bearing-supporting-member extending diametrically across the casing 10 and arranged in apertures 49 in said casing situated below the bead 17. Said member 48 provides a stationary vertical bearing 50 situated at a side of the casing 10 in the vertical plane of the elongated slots 45, 46, and 47, just below said slot 45. Numeral 51 denotes an upper horizontal bearing-supporting-member extending diametrically across the casing 10 and removably mounted in apertures 52 in said casing situated above the upper sieve 16. Said member 51 provides a stationary vertical bearing 53 situated at the same side of the casing as is the bearing 50, and also in the vertical plane of the elongated slots 45, 46, and 47, just above said slot 47. See Fig. 1 in connection with Figs. 2 and 9.

The stationary vertical bearing 53 is arranged at slightly closer distance to the adjacent wall of the casing 10 than is the stationary vertical bearing 50. See Fig. 2.

When the agitators are inserted through the elongated slots 45, 46, and 47 to their proper operating positions in the casing, the passages 31 and the apertures 37 and 39, which as before stated are in alinement with each other, are approximately in alinement with the stationary vertical bearings 53 and 50. With the mentioned parts so positioned, a shaft 54 is inserted first into the vertical bearing 53, then through the bearing aperture 39, then through the passages 31, then through the bearing aperture 37, and finally through the vertical bearing 50. When the shaft 54 is completely inserted, as in Figs. 1 and 2, a head 55 thereon rests upon the upper surface of the vertical bearing 53. It is obvious that insertion of said shaft 54 in the manner as stated, causes the shaft to be slightly out of parallel with the adjacent wall of the casing 10, said shaft slanting downwardly and outwardly from said casing. Thus the shaft 54 evidently exerts an action upon the portion of the agitating unit mounted upon said shaft tending to bend said portion upwardly about the upper walls or edges 56 of the elongated slots 45, 46 and 47 as axes, it being understood that each of said upper walls or edges is in contiguous relation with, or in close proximity to, the upper surface of a corresponding agitator. The upward action upon the outer portion of the agitating unit, naturally, causes the inner portion of each agitator to be forced downwardly to thus exert pressure against the corresponding sieve. Desirably, the agitators possess sufficient flexibility to insure that the major part of each portion of each agitator within the casing resiliently engages its corresponding sieve.

The agitating unit is operated by grasping the handle 13 in one hand, and the spacing elements 32 and 33 in the other, said spacing elements with associated parts evidently supplying the movable handle of the flour sifter actuatable toward and from the fixed handle 13 to oscillate the agitators over the sieves. Said agitators engaging said sieves with pressure, the sieves are effectively vibrated, or flexed upwardly and downwardly, when the agitators are oscillated, to thus very effectively and efficiently accomplish the flour sifting operation.

It will be evident that agitators made of wire, as in Fig. 3, present rounded surfaces to the sieves adapted to move quite smoothly over said sieves. If desired, the superposed portions 28 of the wire in Fig. 3 might be welded or soldered to each other. In such case, bearing elements, such as 34 and 35, can be dispensed with. Or the bearing element could be welded or soldered to said superposed portions of the wire comprising an agitator.

It has been stated hereinbefore that the ends 22 of the spacing members 20 and 21 are spaced apart. This is for the obvious purpose of allowing passage for the agitators 24, 25, and 26.

Also, it has been mentioned above that the sieves 14, 15, and 16, the spacing members 20 and 21, and the bearing support 51 are all easily and quickly removable from the casing 10. It will be apparent that the agitating unit 23 is removable from said casing by ready withdrawal of the shaft 54. It should be added, however, that the tension exerted by said shaft 54 and the agitators against each other places the shaft itself under a tension insuring that it cannot become accidentally removed from its bearings, even though the flour sifter is turned upside down. Evidently, the action or tension exerted from the shaft 54 is in direction tending to push the lower end portion of said shaft inwardly of the casing, thus keeping the lower bearing support with vertical bearing in position, necessitating the employment of no special fastening means for said bearing support.

It might also be added that the agitating unit 23 as illustrated and described has no top and bottom sides. That is, said agitating unit can be operatively inserted into the perforations of the casing either side up.

From the illustration and disclosure as made, it will be seen that when the flour sifter is to be cleaned, the pin 54 is withdrawn, and the agitating unit is freely removed from the casing. The bearing support 51 is given a part turn to be freely withdrawable from the casing, and the sieves 14, 15, and 16 and the spacing members 20 and 21 are pushed out through the top of the flour sifter casing. After the separated parts are cleaned, they can be again assembled in a manner which will be evident from the description made.

In Fig. 11 there is disclosed a flour sifter in all respects like the sifter of Figs. 1 to 4 and 6 to 10, except that the present sifter has a mounting for the agitating unit of modified form. That is, the upper portion of the shaft 54' is perforated to receive a screw 57 removably entering the casing 10. Obviously, the shaft 54' cannot be removed from its bearings until the screw 57 is withdrawn. The shaft 54' is mounted in the same relation to the casing as is the shaft 54. Evidently, the screw mounting in Fig. 11 displaces the upper bearing bracket 51 with vertical bearing 53 in Fig. 2.

In Fig. 12 there is disclosed a flour sifter otherwise like the sifter of Figs. 1 to 4 and 6 to 10, but having an agitating unit including agitators as in Fig. 5, and a further modified form of mounting for said agitating unit. The agitator of Fig. 5 consists of a flat piece of metal 28' having extensions 29', rivet opening 30', and bearing aperture 37', all more or less like the generally corresponding parts of Fig. 3, and for a similar purpose. It will be noted that the agitating unit of Fig. 12 omits bearing elements, such as 34 and 35, the agitators themselves each including a bearing aperture 37', accomplishing the same purposes as the bearing apertures 37 and 39 in Figs. 1 to 4 and 6 to 10. The spacing elements 32' and 33', and the rivet 42' with heads 43' and 44' function in about the manner as in Fig. 2, except that the heads of the rivet engage directly against the upper and lower agitators instead of against bearing elements. The agitators of Fig. 12 are inserted in the casing in the manner as already described. The mounting for the agitating unit of Fig. 12 omits the elements 48, 49, 51, 52 of Fig. 2, and instead includes a lower bracket 58 and an upper bracket 59, each of L shape and having openings into which the shaft 54" is removably insertable until its head 55' engages said bracket 59. The shaft 54" has the same relation in the assembled structure as does the shaft 54. The brackets 58 and 59 are suitably secured to the casing 10 as by screws, welding, or soldering.

In Fig. 13 there is disclosed a flour sifter made according to the invention including a single sieve and an agitating unit having a single agitator. The sieve, represented 14a, may be like the sieve 14, but is as shown removable from the bottom of the casing, being held in said casing by the releasable retaining ring 17a. The agitating unit consists of an agitator 28a, like the agitator 28 in Fig. 5, a single bearing element 35a above and spaced from said agitator, spacing elements 32a, 33a, and a rivet 42a with heads 43a and 44a. The bearing element 35a has an outer rivet receiving opening 38a and an inner bearing aperture 39a. The agitator 28a has an outer rivet receiving opening 36a and an inner bearing aperture 37a. The openings 38a and 36a and the apertures 39a and 37a, respectively, are in alinement. The apertures 38a and 36a receive the rivet, which passes through the spacing elements, and the heads of said rivet attach the bearing element 35a and the agitator 28a to the spacing elements in the manner as already described, and so that said bearing element and said agitator are in a single plane. The shaft 54a and its mounting brackets 58a and 59a are the same as in Fig. 12. It will be evident that the shaft 54a exerts the same influence upon the agitating unit of Fig. 13 as does the shaft 54 of Fig. 2 exert upon the agitating unit there shown, so that the agitator 28a will wipe with pressure against and over the sieve 14a when the operating handle, including the spacing elements 32a and 33a, is oscillated in the manner as hereinbefore described. Evidently, an agitating unit having two or more agitators, as in Figs. 2, 4, 11, and 12, can be employed in connection with a flour sifting casing having but a single sieve, as in Fig. 13. In such case, the bottom agitator would preferably wipe over the sieve, and the upper agitators would simply work or oscillate in the flour to better break it up as will be understood.

Figure 15:
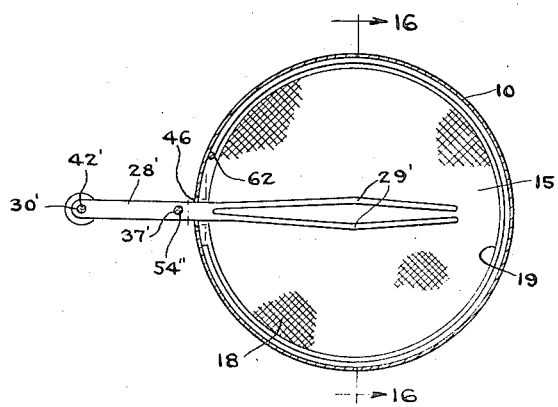
Fig. 15 is a reduced sectional view on the line 15—15 of Fig. 14.
Figure 16:
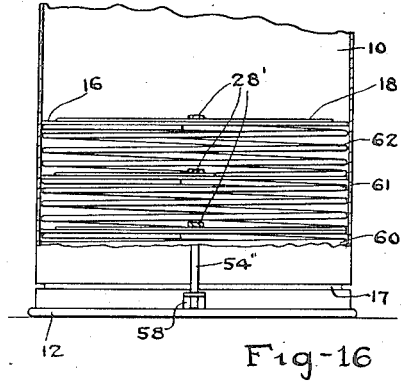
Fig. 16 is a detail sectional view on the irregular line 16—16 of Fig. 15.

In Figs. 14, 15, and 16, the various parts of the flour sifter which are similarly marked are the same as the equivalent parts in Fig. 12, the only differences between these structures being that in the present form of the invention the bead 17 supports a spiral spring 60 which in turn supports the lower screen 14, said lower screen supporting a spiral spring 61 itself supporting the intermediate screen 15, said intermediate screen supporting a spiral spring 62 itself supporting the screen 16, and the shaft 54" is parallel to the adjacent wall of the casing, but may be slanted relatively to said casing. Obviously, in the form of the invention as in Figs. 14, 15, and 16, the spiral springs 60, 61, and 62 cause the pressure to be exerted between the agitators and their corresponding screens. Also, the pressure exerted between the screens and agitators removably fastens the shaft 54" in its bearings in the general manner as already described. When the agitators are to be inserted into the casing including the structure as in Figs. 14, 15, and 16, the upper screen is engaged by the hand and depressed to move all of the screens downwardly in an apparent manner. When the screens are so moved downwardly, the agitators are inserted, as before explained. The arrangement of the spiral springs is such that the agitators can clear said springs, as will be most clear from Fig. 16. Upon the agitators being inserted, they evidently hold the screens depressed, and the spiral springs exert yielding pressure to urge said screens against said agitators. Evidently, any other suitable means for pressing the screens against the agitators can be substituted for the spiral springs disclosed.

Having thus described my invention, I claim:

1. A flour sifter including a flour receiving casing, a sifting screen in said casing, an agitator for co-operating with said sifting screen, means for accomplishing relative flour sifting movement between said agitator and said sifting screen, a device outside of said casing and exerting action upon said agitator to cause it to engage said screen with resilient pressure during the flour sifting operation, and means upon said casing in which said device is removably mounted.

2. A flour sifter including a flour receiving casing, a sifting screen in said casing, an agitator for co-operating with said sifting screen, means for accomplishing relative flour sifting movement between said agitator and said sifting screen, a device for detachably associating said agitator with said casing, and means upon the outside of said casing in which said device is removably mounted, said device causing said screen and said agitator to exert pressure against each other, and said pressure reacting upon said device to maintain it in said means against the possibility of accidental displacement.

3. A flour sifter including a flour receiving casing, a plurality of spaced apart sifting screens removably associatable with said casing and arranged in superposed relation, an agitating unit having a plurality of agitators for co-operating with said sifting screens, said agitators being removably insertable through the wall of said casing, means for actuating said agitating unit to move said agitators over said screens in flour sifting relation thereto, and means detachably mounting said agitators upon said casing, said last mentioned means causing said agitators to engage said screens under pressure.

4. A flour sifter including a flour receiving casing, a sifting screen in said casing, an agitator for co-operating with said sifting screen, said agitator being removably insertable through a side wall of said casing, means for accomplishing flour sifting movement between said agitator and said sifting screen, a device for detachably assembling said agitator upon said casing, and means upon said casing removably carrying said device, said device causing said screen and said agitator to exert pressure against each other, and said pressure reacting upon said device to maintain it in said means.

5. A flour sifter including an open ended flour receiving casing, a sifting screen in said casing and removable from an end thereof, an agitator for cooperating with said sifting screen and removable through a side wall of the casing, means for accomplishing relative flour sifting movement between said agitator and sifting screen, a device for detachably associating said agitator with said casing, and means upon an outer part of said casing in which said device is removably mounted, said device exerting action upon said agitator to cause it to engage said screen with pressure.

BASIL G. HALL.